OR 3,883,222

United Stat

Gunderson

[11] 3,883,222

[45] May 13, 1975

[54] COUPLER FOR OPTICAL COMMUNICATION SYSTEM

[75] Inventor: Leslie C. Gunderson, Painted Post, N.Y.

[73] Assignee: Corning Glass Works, Corning, N.Y.

[22] Filed: Sept. 7, 1973

[21] Appl. No.: 395,165

[52] U.S. Cl. .......................... 350/96 C; 350/96 WG

[51] Int. Cl. .............................................. G02b 5/16

[58] Field of Search ............ 350/96 WG, 96 C, 96 B

[56] References Cited

UNITED STATES PATENTS

| | | | |
|---|---|---|---|
| 3,453,036 | 7/1969 | Swope et al. | 350/96 C UX |
| 3,455,625 | 7/1969 | Brumley et al. | 350/96 C |

*Primary Examiner*—Ronald L. Wibert
*Assistant Examiner*—F. L. Evans
*Attorney, Agent, or Firm*—William J. Simmons, Jr.; Walter S. Zebrowski; Clarence R. Patty, Jr.

[57] ABSTRACT

A coupler for coupling a portion of an optical signal propagating in any one of N optical signal transmission lines to all of the remaining transmission lines. The coupler comprises N optical mixer rods, an end of each transmission line terminating at a first endface of a respective mixer rod. The end of a bundle of optical waveguides is disposed at the second endface of each of the mixer rods. Each bundle is divided into N-1 groups of optical waveguide fibers, a group of fibers extending to the second endface of each of the remaining mixer rods. An optical signal that has propagated through a transmission line radiates into the associated mixer rod which couples that signal to the optical waveguide bundle at the second endface thereof. Each group of fibers in that bundle propagates a portion of the signal to a different one of the remaining mixer rods which couples the signal received thereby to the transmission line connected thereto.

11 Claims, 4 Drawing Figures

COUPLER FOR OPTICAL COMMUNICATION SYSTEM

CROSS-REFERENCE TO RELATED APPLICATION

This application is related to U.S. patent application Ser. No. 376,575 entitled "Optical Communication System" filed by R. E. Love et al. on July 5, 1973 and assigned to the assignee of the present invention.

BACKGROUND OF THE INVENTION

The continually increasing amount of traffic that communication systems are required to handle has hastened the development of high capacity systems. Even with the increased capacity made available by systems operating between $10^9$ Hz and $10^{12}$ Hz, traffic growth is so rapid that saturation of such systems is anticipated in the very near future. High capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz.

The transmitting media utilized in the transmission of frequencies around $10^{15}$ Hz are hereinafter referred to as optical signal transmission lines or merely transmission lines which may consist of a single optical waveguide or a bundle thereof. Optical waveguides normally consist of an optical fiber having a transparent core having a refractive index $n_1$ surrounded by a layer of transparent cladding material having a refractive index $n_2$ which is lower than $n_1$. Although the theory of optical waveguides has been known for some time, practical optical waveguides that do not absorb an excessive amount of transmitted light have been developed only recently. For example, U.S. Pat. No. 3,659,915 discloses a low loss optical waveguide comprising a cladding layer of fused silica and a core of fused silica doped with one or more materials that selectively increase the index of refraction of the core above that of the cladding.

To establish an optical communication system between a plurality of stations, a variety of interconnection schemes may be utilized. Each station can be "hard wired" to every other station, but when many stations must be interconnected, the excessive amount of optical signal transmission line required causes this method to be undesirable due to both the cost of the transmission line and the space consumed thereby. The stations may be interconnected by a loop data bus which drastically reduces the required amount of optical signal transmission line, but the large number of couplers required in such a system introduces an excessive amount of loss, especially in those systems in which there are many stations.

The optical communication network disclosed in said related patent application takes advantage of unique properties of optical signal transmission lines and enables the interconnection of a plurality of stations with much less transmission line than that which would be required by hard wiring, and yet it is not plagued by the losses encountered in the aforementioned loop data bus. Briefly, the communication network disclosed in said related application consists of a number of stations, all of which are connected by separate optical signal transmission lines to a common passive coupler which is adapted to receive an optical signal from one of the stations and couple a portion thereof to the transmission line associated with each of the other stations. The coupler employed in this system should couple light from each optical signal transmission line to the remainder of such transmission lines and should introduce a minimum of loss into the system. The coupler of the present invention is useful in such a system.

SUMMARY OF THE INVENTION

Briefly, the coupler of the present invention comprises a plurality of elongated transparent mixer rods, each of which has first and second planar endfaces that are substantially perpendicular to the axis thereof. Means are provided for connecting an optical signal transmission line to the first endface of each of the mixer rods. A bundle of optical waveguide fibers is coupled to the second endface of each of the mixer rods. Each of these bundles is divided into groups of fibers, one of which extends to the second endface of each of the remaining mixer rods.

As used herein, the word "transparent" indicates transparency to those wavelengths of light that are transmitted by the optical signal transmission lines with which this coupler is associated.

DESCRIPTION OF THE PREFERRED EMBODIMENT

Figures 1, 2:
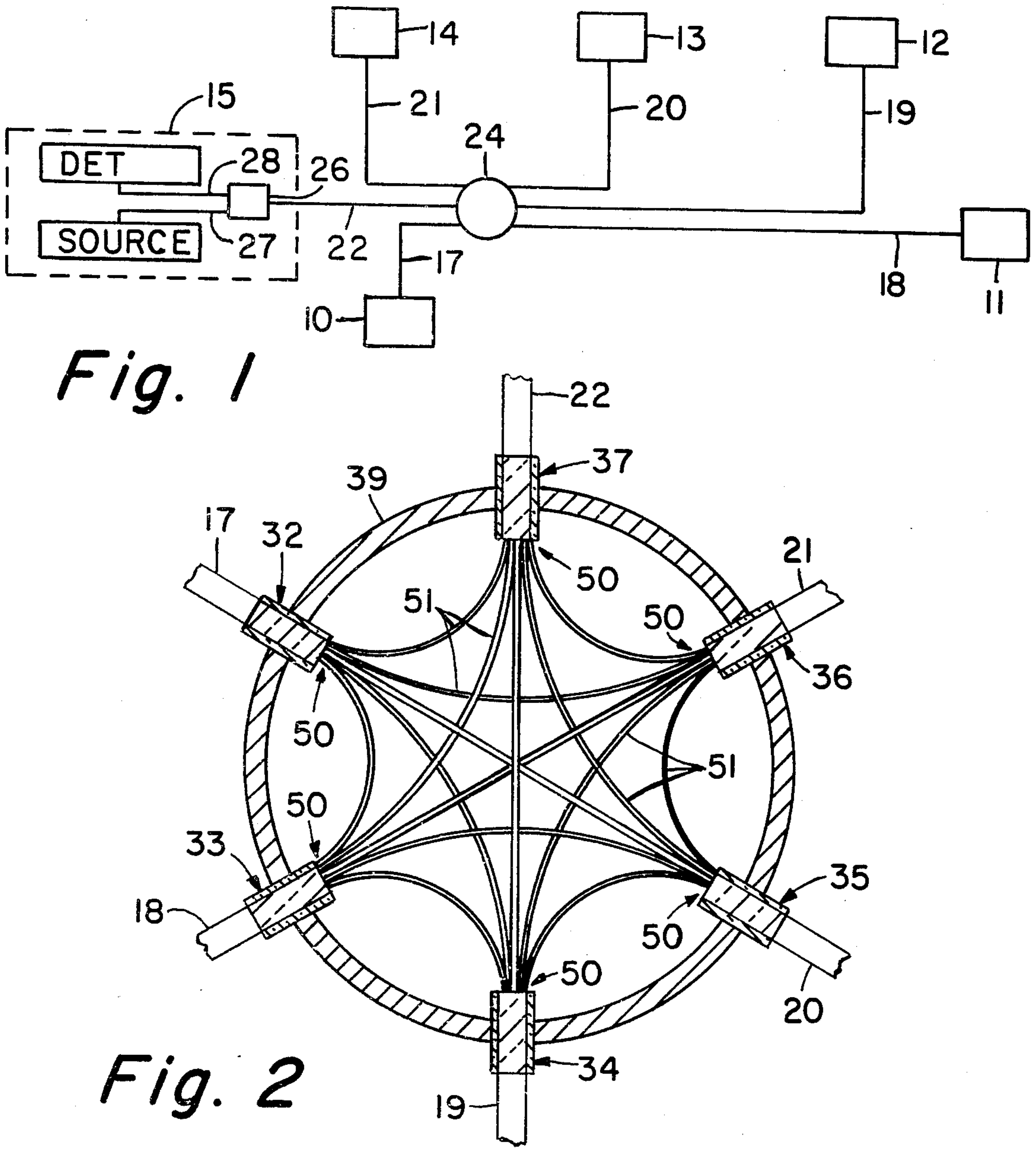
FIG. 1 is a schematic illustration in block diagram form of an optical communication system in which the coupler of the present invention is employed.
FIG. 2 is a cross-sectional view of an optical signal coupler constructed in accordance with the present invention.

FIG. 1 is a schematic illustration in block diagram form of an optical communication system of the type disclosed in said related application. A plurality of stations 10 through 15 are interconnected by optical signal transmission lines 17 through 22 and passive coupler 24. Each of the stations 10 through 15 may be constructed in the manner illustrated at station 15 wherein mixer rod 26 is connected to a light source and light detector by bundles 27 and 28 of optical waveguides. Coupler 24 is adapted to receive an optical signal from any one of the stations and couple a portion of that signal to the transmission line associated with each of the other stations.

In accordance with the present invention, coupler 24 is constructed as illustrated in FIG. 2. A plurality of elongated transparent mixer rods 32 through 37, which are equal in number to the number of stations in the system, are supported by housing 39. Each mixer rod preferably consists of a cylindrically shaped rod of transparent material surrounded by means for providing a light reflecting interface. Although air or a metallic reflecting layer may be used, it is preferred that the transparent rod be surrounded by a layer of transparent cladding material having a refractive index lower than that of the rod. For example, mixer rod 32, which is shown in greater detail in FIG. 3, may consist of a cylindrical glass rod 41 surrounded by a layer 42 of cladding glass having a refractive index lower than that of rod 41. Endfaces 43 and 44 of rod 41 are polished and are substantially perpendicular to the axis thereof. Support means 46 and 47 position the optical waveguide bundles terminating adjacent to endfaces 43 and 44, respectively, in such a manner that the longitudinal axes of the end portions of the waveguide fibers are substantially parallel to the axis of rod 41 and the ends of the fibers are disposed adjacent to their respective endface. Since the optical signal transmission lines of the system in which coupler 24 is employed must be connected to the mixer rods, support means 47 may also function as means for connecting an optical signal transmission line to a mixer rod. Layers 48 and 49 of index matching fluid may be disposed between the ends of the optical waveguides and the respective endface of rod 41 to provide good optical coupling therebetween.

Figure 3:
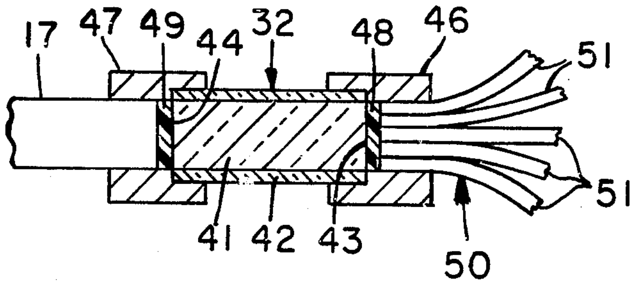
FIGS. 3 and 4 are cross-sectional views of optical mixer rods that may be employed in the device of FIG. 2.
Figure 4:
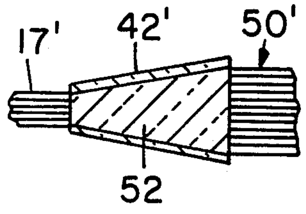

Whereas a cylindrical mixer rod is illustrated in the preferred embodiment, rods of other geometrical configurations may be employed. For example, if the cross sectional area of the optical waveguide bundle disposed at one end of the mixer rod differs substantially from that at the other end thereof, a conically shaped rod may be used. A conically shaped mixer rod is illustrated in FIG. 4 wherein elements similar to those of FIG. 3 are represented by primed reference numerals. In this embodiment the endfaces of tapered rod 52 are of appropriate size to accommodate the different number of fibers in transmission line 17' and bundle 50'. The function of mixer rods 32 through 37 is to distribute, by the process of direct propagation as well as internal reflection from the interface between the core and cladding, an optical signal from any fiber at one endface thereof to all of the fibers at the other endface thereof.

Referring again to FIG. 2, one of the optical signal transmission lines 17 through 22 is coupled between each station and the first endface of one of the mixer rods 32 through 37. A bundle 50 of optical waveguide fibers is coupled to the second endface of each of the mixer rods. Each of these bundles is divided into groups 51 of fibers, a group extending to the second endface of each of the remaining mixer rods. Since the mixer rods are preferably cylindrically shaped and since the optical waveguide fibers of transmission lines 17 through 22 and those of bundles 50 usually have the same diameter, the transmission lines and bundles 50 usually have the same number of fibers. If, for example, the bundles 50 each contained fifty optical waveguide fibers, each group 51 would contain ten fibers, since each mixer rod must be coupled to five other mixer rods.

An optical signal from station 10, for example, propagates through transmission line 17 and is injected into mixer rod 32, thereby causing the illumination of all of the fibers of the bundle 50 at the second endface thereof. A portion of the optical signal is thereby coupled by one of the waveguide bundles 50 to each of the remaining mixer rods 33 through 37 which couples the signal to each of the remaining stations by transmission lines 18 through 22, respectively.

I claim:

1. An optical coupler comprising at least four elongated transparent mixer rods, each rod having first and second planar endfaces that are substantially perpendicular to the axis thereof, means for connecting an optical signal transmission line to the first endface of each of said mixer rods, a plurality of bundles of optical waveguide fibers, one of said bundles being coupled to the second endface of each of said mixer rods, each of said bundles being divided into groups of fibers, one of which extends to the second endface of each of the remaining mixer rods, and a housing for supporting said mixer rods, said plurality of bundles of optical waveguide fibers being disposed within said housing.

2. A coupler in accordance with claim 1 wherein each of said mixer rods comprises a rod of transparent material and a layer of transparent cladding material disposed upon the surface of said rod, the refractive index of said cladding material being lower than that of said rod.

3. A coupler in accordance with claim 2 further comprising a layer of refractive index matching fluid disposed adjacent to the first and second endfaces of each of said mixer rods.

4. A coupler in accordance with claim 3 wherein each of said groups of optical waveguide fibers contains the same number of fibers.

5. A coupler in accordance with claim 4 wherein said rods are cylindrically shaped.

6. A coupler in accordance with claim 4 wherein said rods are conically shaped.

7. In an optical communication system having a plurality of optical signal transmission lines each comprising at least one optical waveguide having a core of transparent material having a refractive index $n_1$ surrounded by a layer of transparent cladding material having a refractive index $n_2$ that is lower than $n_1$, a coupler for coupling the signal in any one of said optical signal transmission lines to all of the remaining transmission lines, said coupler comprising at least four elongated transparent mixer rods each having first and second planar endfaces that are substantially perpendicular to the axis thereof, means disposed adjacent to the periphery of the first endface of each of said mixer rods for connecting the end of a respective one of transmission lines adjacent to said first endface, the optical waveguides of which said transmission line is comprised terminating in faces that are disposed in a substantially planar array adjacent to said first endface, a plurality of bundles of optical waveguide fibers, one of said bundles being coupled to the second endface of each of said mixer rods, each of said bundles being divided into groups of fibers, one of which extends to the second endface of each of the remaining mixer rods, and a housing for supporting said mixer rods, said plurality of bundles of optical waveguide fibers being disposed within said housing.

8. A coupler in accordance with claim 7 further comprising means disposed adjacent to the periphery of the second endface of each of said mixer rods for supporting the end of a respective one of said bundles adjacent to said second endface.

9. An optical coupler in accordance with claim 8 wherein each of said mixer rods comprises a cylindrically shaped rod of transparent material and a layer of transparent cladding material disposed upon the surface of said rod, the refractive index of said cladding material being lower than that of said rod.

10. An optical coupler in accordance with claim 9 further comprising a layer of refractive index matching fluid disposed adjacent to the first and second endfaces of each of said mixer rods.

11. An optical coupler in accordance with claim 10 wherein each of said groups of optical waveguide fibers contains the same number of fibers.

* * * * *